(12) United States Patent
Singh et al.

(10) Patent No.: US 11,549,157 B2
(45) Date of Patent: Jan. 10, 2023

(54) METHOD FOR MODIFYING SURFACE GRAIN STRUCTURE OF THE MATERIAL AND APPARATUS THEREOF

(71) Applicant: SHIV NADAR UNIVERSITY, Uttar Pradesh (IN)

(72) Inventors: Harpreet Singh, Dadri (IN); Harpreet Singh Grewal, Dadri (IN); Jaskaran Singh Saini, Dadri (IN); Karthikeyan Selvam, Dadri (IN)

(73) Assignee: Shiv Nadar University, Dadri (IN)

( * ) Notice: Subject to any disclaimer, the term of this patent is extended or adjusted under 35 U.S.C. 154(b) by 344 days.

(21) Appl. No.: 16/631,356

(22) PCT Filed: Jan. 4, 2018

(86) PCT No.: PCT/IN2018/050004
§ 371 (c)(1),
(2) Date: Jan. 15, 2020

(87) PCT Pub. No.: WO2019/016824
PCT Pub. Date: Jan. 24, 2019

(65) Prior Publication Data
US 2020/0140967 A1    May 7, 2020

(30) Foreign Application Priority Data
Jul. 19, 2017   (IN) .............................. 201711025562

(51) Int. Cl.
*B23K 20/12*      (2006.01)
*C21D 7/13*       (2006.01)

(52) U.S. Cl.
CPC ............ *C21D 7/13* (2013.01); *B23K 20/1235* (2013.01); *B23K 20/1275* (2013.01); *C21D 2221/00* (2013.01)

(58) Field of Classification Search
CPC .. C21D 7/13; C21D 2221/00; B23K 20/1275; B23K 20/12–1295
(Continued)

(56) References Cited

U.S. PATENT DOCUMENTS 6,398,883 B1    6/2002  Forrest et al.
6,516,992 B1 *  2/2003  Colligan ............. B29C 65/0681
                                                228/222
(Continued)

FOREIGN PATENT DOCUMENTS

CN       104558670       4/2015
CN       105385820       3/2016
(Continued)

OTHER PUBLICATIONS

Machine translation of KR-20130110301A (no date available).*
International Search Report issued in International Application No. PCT/IN2018/050004, dated Apr. 11, 2018, 2 pages.

*Primary Examiner* — Kiley S Stoner
(74) *Attorney, Agent, or Firm* — Hamre, Schumann, Mueller & Larson, P. C.

(57) ABSTRACT

The present invention provides a simple, cost effective and hassle-free method and apparatus for modifying the surface grain structure of the material, thereby providing a material with multi-modal grain structure having high strength and good formability. The present invention uses a single step processing technique known as submerged static friction stir processing for modifying the surface grain structure of the material, thereby generating a multi-modal grain structure. In the present invention since the working material is completely immersed in the coolant, this maintains the working temperature of the system. Further the present invention does not involve long processing steps and do not need any specialized equipments.

14 Claims, 2 Drawing Sheets

(58) Field of Classification Search
USPC .............................. 228/2.1–2.3, 112.1–114.5
See application file for complete search history.

(56) References Cited

U.S. PATENT DOCUMENTS

| | | | |
|---|---|---|---|
| 6,712,916 B2 | 3/2004 | Mishra et al. | |
| 7,740,162 B2* | 6/2010 | Ilyushenko | B23K 20/1275 228/2.1 |
| 8,220,693 B2* | 7/2012 | Krajewski | C23C 26/00 228/159 |
| 8,820,610 B2* | 9/2014 | Hangai | C22C 21/06 228/112.1 |
| 10,661,379 B1* | 5/2020 | Larsson | B23D 79/021 |
| 2005/0045694 A1* | 3/2005 | Subramanian | B23K 37/06 228/112.1 |
| 2008/0099533 A1* | 5/2008 | Hanlon | B29C 66/91221 228/112.1 |
| 2009/0014497 A1* | 1/2009 | Ryu | H01M 8/0297 228/2.3 |
| 2009/0065178 A1* | 3/2009 | Kasezawa | H01L 23/473 165/104.19 |
| 2009/0152328 A1* | 6/2009 | Okamoto | B23K 20/128 228/2.1 |
| 2009/0200359 A1* | 8/2009 | Chen | B23K 20/1265 228/112.1 |
| 2010/0176182 A1* | 7/2010 | Hanlon | B23K 20/126 228/2.1 |
| 2010/0243714 A1* | 9/2010 | Allehaux | B23K 20/1235 228/2.1 |
| 2011/0308059 A1* | 12/2011 | Seo | B23P 15/26 29/428 |
| 2012/0298304 A1* | 11/2012 | Kato | B23K 20/1235 228/2.1 |
| 2014/0034709 A1 | 2/2014 | Oki et al. | |
| 2014/0183245 A1* | 7/2014 | Yamaguchi | B23K 20/125 228/2.1 |
| 2016/0184922 A1* | 6/2016 | Kikyo | B23K 20/1265 228/114.5 |
| 2016/0355902 A1* | 12/2016 | Yang | B23K 11/115 |
| 2017/0120398 A1* | 5/2017 | Veldsman | B23K 37/003 |
| 2018/0021881 A1* | 1/2018 | Weigl | B23K 20/1285 228/103 |
| 2018/0221987 A1* | 8/2018 | Weigl | B23K 20/1255 |
| 2019/0126385 A1* | 5/2019 | Odakura | B23K 20/1235 |
| 2019/0240716 A1* | 8/2019 | Yuan | C22F 1/04 |
| 2019/0299325 A1* | 10/2019 | Landmark | B23K 20/123 |

FOREIGN PATENT DOCUMENTS

| | | |
|---|---|---|
| CN | 106011422 | 10/2016 |
| KR | 20130110301 A * | 10/2013 |

* cited by examiner

METHOD FOR MODIFYING SURFACE GRAIN STRUCTURE OF THE MATERIAL AND APPARATUS THEREOF

FIELD OF THE INVENTION

The present invention relates to the surface grain refinement of the material. In particular, the present invention relates to the ultra fine grain refinement of the material in solid state, for developing multimodal grain structure.

BACKGROUND OF THE INVENTION

Advanced structural assemblies are commonly fabricated from a plurality of structural members secured together to form a built-up structure. The structural members are typically forged, machined from stock material or cast into various configurations from various metals and metal alloys. These structural assemblies during operation are subjected to several static and cyclic loads, as well as a variety of environmental conditions, including temperature variations, acoustic and vibrational interferences, all of which create mechanical and thermal stresses on the material. While these operational stresses generally exist throughout the individual structural members, certain regions of the structural member are subjected to comparatively higher magnitudes of stress. High operational stresses can lead to microcracking or fracture of the structural members, which results in eventual failure of the structural assembly. In addition, due to the large number of parts and fasteners utilized in the construction of structural assemblies, maintenance, repair and replacement of structural members is time consuming, labour intensive, and expensive over the life of the assembly.

Generally, strength and ductility of metal alloys are inversely correlated to each other. Advanced applications demand for metals and metal alloys having high strength and good formability. In certain applications, high strength metals are to be formed into complex geometries which is very tedious, time consuming and costly process. Often high strength material tends to form cracks on the surfaces while undergoing tensile strain during bending or forming operations. Such cracks tend to propagate through the bulk material, resulting in premature failure.

In seeking to enhance the strength, toughness and fatigue resistance of structural members and, thus, increase the useful life of structural assemblies, designers have modified the dimensions of the structural members in the regions of high operational stress, for example, by increasing the thickness of the members in these regions. Designers have also experimented with substituting more exotic and, typically, more expensive types of materials for use in the fabrication of the structural members. Structural members are subjected to precipitation hardening whereby the members are solution heat treated and then aged at predetermined temperature schedules to improve the grain structure and the material properties of the members. However, the precipitation hardening process can be time intensive and provides only limited improvement of material properties, and even selective increase in the thickness of a structural member can negatively increase the overall weight of the structural assembly, as well as resulting in increased material cost.

Accordingly, there remains a need for improved structural members and methods of manufacture that will increase the operational life of structural assemblies. The improved structural members must have enhanced strength, toughness and fatigue resistance, especially in those regions subjected to high operational stresses.

It is commonly recognized that the grain structure of structural members has significant influence on the material properties of the structural members. The strength, plasticity and toughness of the material are improved with the decrease of the grain size. Increase in strength by microstructure refinement leads to significant loss in ductility. This is mainly attributed to the limited accommodation of high dislocation density in finer grains.

The grain structure is one of the primary factors that influences the formability, toughness, weldability, corrosion resistance and strength of the structural members. The medium and thick plate alloy material is mainly obtained by rolling, and the grain in the material after rolling is coarse and uneven. Therefore, it is a hot research topic to improve the comprehensive mechanical properties of the material by tailoring the grain structure. An innovative approach to circumvent this is the development of bi-modal structures with finer grains embedded in coarser structures. However, development of multi-modal or bi-modal structures is challenging and involves multiple processing steps with long processing times. This limitation restricts the practical utilization of bi-modal structures.

In seeking to improve the material properties of structural members constructed of metals and metal alloys, it has been proposed to refine the grain size of the structural members through a severe plastic deformation processes. Equal channel angular extrusion is one of the most commonly used severe plastic deformation process. Equal angle extrusion involves forcing a workpiece, using pneumatic or hydraulic pressure, through a die having a 90° bend. In theory, equal angle extrusion refines the existing grain structure of the workpiece such that the resulting material exiting the extrusion die will exhibit a reduction in grain size. However, difficulties associated with large loads on the die and cracking of the workpiece, can adversely affect the properties of the material exiting the die. As a result, equal angle extrusion has not been used in large-scale production.

Thus, there remains a need for an apparatus for refining the grain structure of workpieces to thereby provide structural members having improved material properties, such as formability, weldability, toughness, corrosion resistance, and strength. The apparatus should be capable of operating on workpieces that are formed of a variety of metals and metal alloys and that have a variety of configurations. The apparatus also should be cost effective and should be scalable for use in large-scale production operations.

Friction stir processing (FSP) is a process for modification of pure metals and alloys and/or preparation of composite materials. FSP was basically derived from the process known as Friction stir welding (FSW). FSW was developed in 1991 for non-weldable or difficult to weld materials. Based on principles of FSW, Prof. Mishra from University of Missouri developed friction stir processing in the year 2001. The basic purpose of FSP is microstructural refinement of materials. Friction stir processing (FSP) involves passing a rotating FSP tool/probe through a metallic material to locally create a microstructure providing improved mechanical properties. The FSP operation is typically performed at room temperature but the friction and metal deformation involved raises the local temperature to just below the solidus temperature so that the friction stir processed material is annealed and fully recrystallized. Since the material does not undergo melting during FSP, such as occurs during fusion welding, overaging in the heat affected zone is significantly less. Friction stir processing has been demonstrated for a variety of metals and metal alloys, including aluminum, titanium, bronze, and steel materials.

The FSP approach has been used to locally improve the mechanical properties in high-stress areas of cast metal parts but has not previously been applied to enable grain refinement to provide a multimodal grain structure.

Accordingly, the present invention provides a novel and simple method for grain refinement of a metal surface, which can effectively generate bimodal grain structures in metals and metal alloys.

CN106011422 discloses a high-strength steel with bimodal scale ferrite structure and a low cost preparation method thereof. Ordinary low carbon steel is adopted as a raw material plate, cold deformation and two-phase region quenching are carried out to obtain a bimodal scale structure with fine quasipolygonal ferrite grains distributed around coarse polygonal ferrite grains, the fine quasipolygonal ferrite grains plays a role of strengthening phase, and the coarse polygonal ferrite grains guarantee the steel plasticity. The high-strength steel prepared by the preparation method provided by the invention has excellent comprehensive mechanical properties, yield strength, tensile strength, and yield ratio. At the same time, the process is simple and the production cost is low.

CN104558670 provides a novel method for preparing a bimodal structure through supercritical carbon dioxide. The method is characterized in that a plurality of fillers fill polystyrene, polymethyl formamide and other polymers, then the supercritical carbon dioxide is utilized to process, and the one-step method is carried out, so as to simply and effectively prepare a bimodal foaming material; the process is simple, the efficiency is greatly increased, and meanwhile, the applicable scope is wide; a literature report shows that the method for preparing the bimodal foaming material includes a two-step pressure release method and a multi-foamer method. However, the processes of the two methods have some problems such as complex process, high device requirement, and selection of a nucleating agent, and therefore, the preparation of the bimodal foaming material is certainly limited.

CN105385820 provides a grain refinement method of a medium-thickness plate alloy material. According to the method, grain refinement is performed on the medium-thickness plate alloy material through a friction stir processing technology. The method includes the following steps that under the condition that a stirring head rotates at a high speed, a stirring needle is slowly punctured into the medium-thickness plate alloy material till the shaft shoulder of the stirring head makes contact with the surface of the material, then the stirring needle marches forwards in the material, and first-time friction stir processing is completed; the friction stir processing operation is repeated, till grain refinement of the medium-thickness plate alloy material is completed. Finally a superfine, compact and uniform equiaxed fine-grain or ultrafine grain structure is obtained.

U.S. Pat. No. 6,712,916 discloses a process for enhancing the superplasticity of metal by involving friction stirring at least a segment of a single piece of bulk metal to impart superplasticity thereto and thereby yield a single superplastic metal.

U.S. Pat. No. 6,398,883 discloses a method for selectively improving the strength, toughness and fatigue resistance of a structural member. The process includes positioning a friction stir welding probe adjacent the region of the structural member having comparatively high operational stress. A rotating friction stir welding probe can then be inserted through the outer surface of the structural member proximate to the region of high operational stress to locally refine the grain structure of the high-stress region. The rotating friction stir welding probe can be moved through the structural member along a path corresponding to the region of high operational stress. The friction stir welding probe can be withdrawn from the outer surface of the structural member to thereby define a threaded opening at least partially within the region of the structural member having a locally refined grain structure. If desired, the structural member can be precipitation hardened prior to or after the inserting step.

The above patents discloses the friction stirring of the surface to refine the surface grain structure of the metal alloy and does not teach anything about the bimodal or multimodal structure formation. In the above said methods usually, the primary processing step is followed by one or more secondary processing steps such as annealing/cryogenic treatments at different temperatures for long time durations. This increases the complexity as well as the associated cost. Further in the above method, aim to develop refined grain structures which results in trade-off between strength and ductility of the metal alloy. Therefore for above reasons there is need in the art to provide a method for developing multimodal structure on the surface of the metal alloy, which have high strength and good formability. The present invention also provides a simple, cost effective and hassle-free apparatus for obtaining such structure. The present invention provides a single step processing and does not involve long processing steps and do not need any specialized equipments as is the case for existing techniques.

OBJECTIVE OF THE INVENTION

The main objective of the present invention is to provide a method for modifying the surface grain structure of the material, thereby providing a multi-modal grain structure.

Another objective of the present invention is to provide a method for modifying the surface grain structure of the material, which has high strength and good formability.

Yet another objective of the present invention is to provide a method for modifying the surface grain structure of the material, which is cost effective and time efficient.

Still another objective of the present invention is to provide a method for modifying the surface grain structure of the material, where solid state of the material is maintained.

Still yet another objective of the present invention is to provide an apparatus for enabling the surface grain structure of the material, to achieve the foresaid objectives.

SUMMARY OF THE INVENTION

The present invention provides a simple, cost effective and hassle-free method and apparatus for modifying the surface grain structure of the material, thereby providing a multi-modal grain structure having high strength and good formability. An apparatus (100) for modifying surface grain structure of the material, thereby generating a multimodal grain structure, comprising of: a work station (101), for accommodating the working material; a fastening means, for holding the working material in position; a spindle (102) provided with a collet and a probing pin, for processing the working material; a motor, for rotating the spindle (102) and probing pin; a controller, for controlling the operation of the said spindle (102); a chamber (103), for accommodating the working material along with the fastening means and flowing coolant; a cooling unit (106), for supplying coolant to the chamber (103), wherein said coolant is circulated through the chamber by means of inlet (104) and the means for outlet (105); and a power source, for supplying power to the said cooling unit (106), the said motor and the said work station (101). In the present invention since the working material is completely immersed in the coolant, this maintains the working temperature of the system. Further the present invention provides a simple, single step and time efficient method for modifying the surface grain structure of the working material for generating multi-modal structures employing the said apparatus.

BRIEF DESCRIPTION OF THE DIAGRAMS

Figure 1:
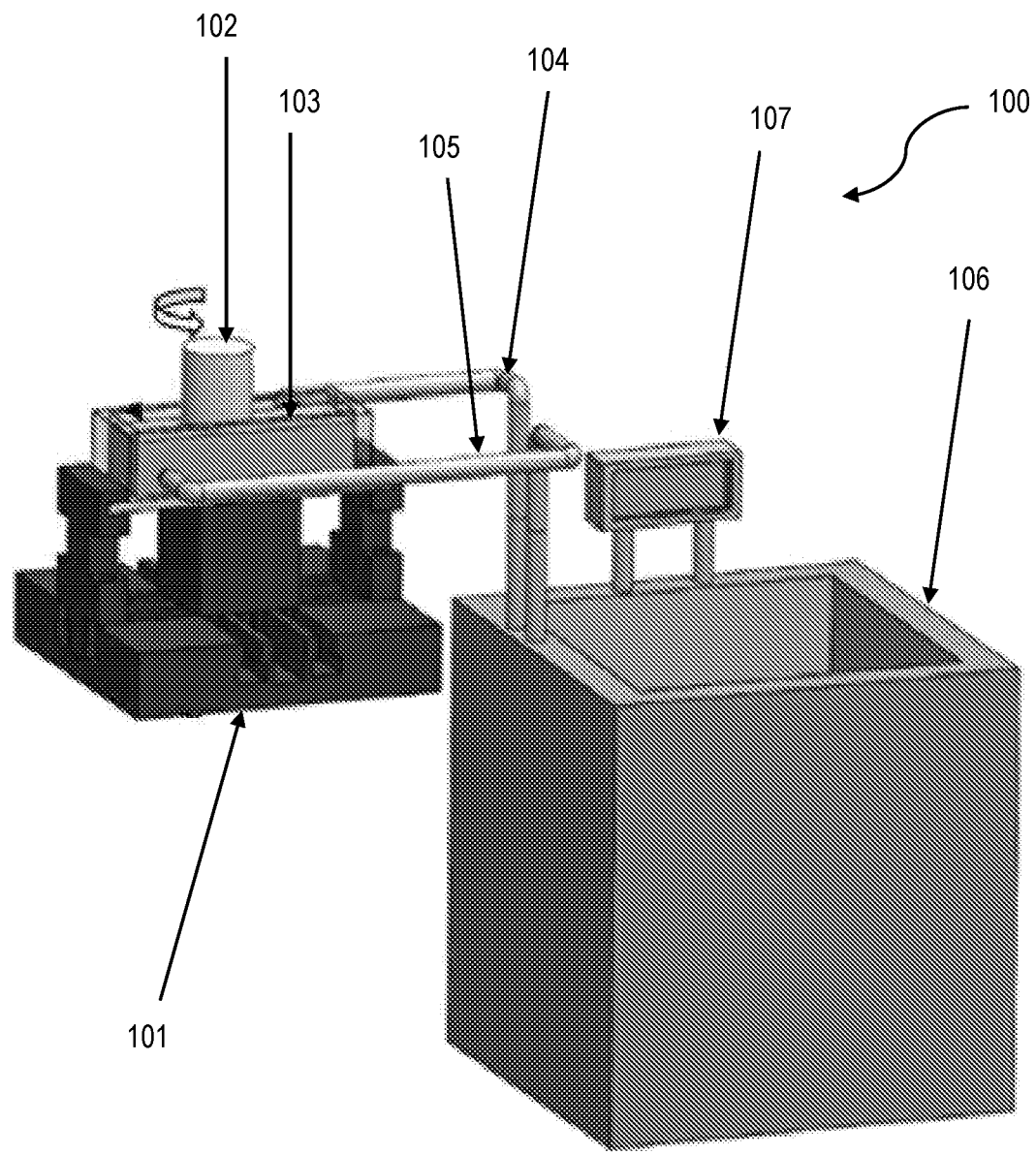
FIG. 1 shows the apparatus set-up for enabling surface grain refinement according to the present invention for generating multi-modal grain structures.
Figure 2:
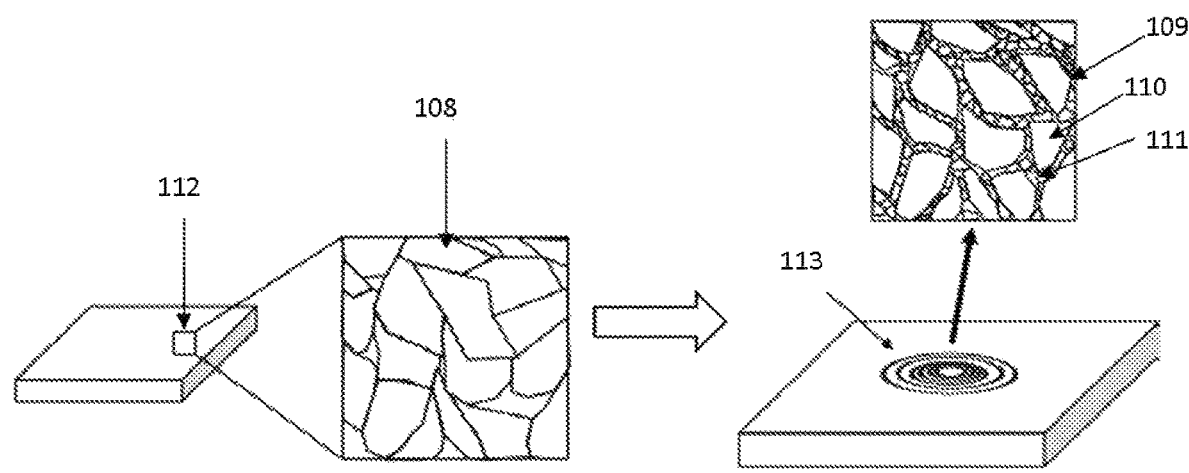
FIG. 2 depicts the bimodal structure generated in the working material as a result of surface grain refinement according to the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE INVENTION

The present invention as embodied by a method for modifying surface grain structure of the material and an apparatus thereof, succinctly fulfils the above-mentioned need(s) in the art. The present invention has objective(s) arising as a result of the above-mentioned need(s), said objective(s) being enumerated below. In as much as the objective(s) of the present invention are enumerated, it will be obvious to a person skilled in the art that, the enumerated objective(s) are not exhaustive of the present invention in its entirety, and are enclosed solely for the purpose of illustration. Further, the present invention encloses within its scope and purview, any structural alternative(s) and/or any functional equivalent(s) even though, such structural alternative(s) and/or any functional equivalent(s) are not mentioned explicitly herein or elsewhere, in the present disclosure. The present invention therefore encompasses also, any improvisation(s)/modification(s) applied to the structural alternative(s)/functional alternative(s) within its scope and purview. The present invention may be embodied in other specific form(s) without departing from the spirit or essential attributes thereof.

Throughout this specification, the use of the word "comprise" and variations such as "comprises" and "comprising" may imply the inclusion of an element or elements not specifically recited.

An apparatus (100) for modifying surface grain structure of the material, for generating a multimodal grain structure, comprises of: a work station (101), said work station (101) is fixed on a vertical milling machine; a fastening means, wherein a working material of required dimension is fastened to the said work station (101) by the said fastening means; a spindle (102), positioned above the work station (101) at a pre-defined height, wherein said spindle (102) is movable and height adjustable, wherein said spindle (102) is rotated at pre-defined speed; a collet, affixed inside the spindle; a probing pin, accommodated inside the collet; a motor, said motor is operatively connected to the spindle (102); a controller, said controller controls the spindle (102) movement, rotating speed and height adjustment; a chamber (103), positioned on top of the work station (101), wherein said chamber (103) accommodates the fastened material, and are provided with a means for inlet (104) and a means for outlet (105); a cooling unit (106), said cooling unit (106) conducts a cooling medium to the chamber (103) through the said means for inlet (104) and the said means for outlet (105); and a power source, said power source supplies power to the said cooling unit (106), the said motor and the said work station (101).

In the preferred embodiment, wherein the said chamber (103) is a 4-wall chamber, wherein said pre-defined speed of the spindle (102) ranges from 50 rpm to 5000 rpm.

In the preferred embodiment of the present invention, wherein said probing pin is a non-deformable tool, wherein said probing pin is made of a harder material than the material whose surface grain is to be modified.

In the preferred embodiment of the present invention, the said apparatus (100) in particular the cooling unit (106) is further provided with a controlling means (107), said controlling means (107) controls the temperature and volume of the said cooling medium to be conducted to/from the chamber (103). Said cooling medium is a liquid coolant, wherein the coolant's temperature ranges from −100 to +30 degree Celsius.

A method for modifying the surface grain structure of the material, comprising of:
  fastening of the working material to the work station (101) by means of the said fastening means;
  supplying power to the work station (101), the motor, and the cooling unit (106) by means of the power source;
  circulating the cooling medium from/to the cooling unit (106) to/from the chamber (103) through the said means for inlet (104) and the said means for outlet (105), to maintain a pre-defined temperature of the chamber, wherein the working material is submerged by the cooling medium in the chamber (103);
  rotating the said probing pin affixed to the spindle (102) at a pre-defined rotational speed, wherein the said motor provides rotational energy to the spindle (102), wherein said spindle (102) rotates at a pre-defined rotational speed, thereby rotating the said probing pin;
  bringing the rotating probing pin in contact at a specified location of the surface of the working material, wherein the said probing pin penetrates through the material at a pre-defined depth;
  continuing the process i.e. rotation of the probing pin at a pre-defined rotational speed for a pre-defined time period at a specified location on the surface of the working material;
  removing the rotating probing pin from the material after the pre-defined time period of rotation; and
  shutting off the power supply of power from the power source.

In the preferred embodiment of the present invention, wherein said pre-defined rotational speed of the probing pin ranges from 50 rpm to 5000 rpm, more preferably ranges from 1000 rpm to 2500 rpm. wherein said pre-defined depth penetration of the probing pin through the material is limited up-to 50% of thickness the material. wherein said predefined time period of the rotation of the probing pin is modulated based on required length of the multimodal structure, preferably predefined time period of the rotation of the probing pin ranges between 30 seconds to 60 minutes. wherein said pre-defined temperature of the cooling medium ranges from −100 degree Celsius to 30 degree Celsius.

Example 1

In an exemplary embodiment, the working material selected is stainless steel material (112). Said working material of required dimension and thickness of more than 0.6 mm having coarse grain structure (108), is fastened on the work station (101) by fastening means. The cooling medium used is a mixture of distilled water and ethanol in equal proportion. Said cooling medium is conducted from the cooling unit (106) to the said chamber (103) through the said means for inlet (104). The temperature of the cooling medium is −30 degree Celsius. The pre-defined temperature of the cooling medium in the chamber is set to be −30 degree Celsius. The cooling medium circulates from/to the chamber (103) to/from the cooling unit (106) through the said means for outlet (105) and the said means for inlet (104), to maintain the pre-defined temperature of the chamber. The pre-defined rotational speed of the probing pin is set as 1800 rpm. Said probing pin a non-deformable tool is made of tungsten carbide material. wherein the probing pin is harder than the working material. The rotating probing pin is brought in contact with the surface of the working material at a specified location (113). The rotating probing pin penetrates through the working material through a pre-defined depth. Said predefined depth is 0.3 mm. The rotation of the probing pin is continued at the specified location (113) on the working material for a pre-defined time period. Said pre-defined time period is selected based on the required length scale of the multimodal structure, in the preferred example the pre-defined time period is 10 minutes. After processing for the pre-defined time period the rotating probe is removed from the material and the supply of power from the power source is discontinued. The said processing generates a multi-modal structure on the surface of the working material i.e. the stainless steel. Said multi-modal grain structure is a coarse grain bi-modal grain structure. Wherein the bi-modal (109) grain structure having a coarse grain (110) of 10 μm while fine grains (111) of nearly 500 nm, located at the grain boundaries of coarse grains.

Example 2

In an another exemplary embodiment, the working material selected is a stainless steel material. Said material of required dimension and thickness of more than 0.6 mm, is fastened on the work station (101) by the said fastening means. The cooling medium is a mixture of distilled water and ethanol in equal proportion. Said cooling medium is conducted from the cooling unit (106) to the chamber (103) through the said means for inlet (104). The temperature of the cooling medium is −30 degree Celsius. The pre-defined temperature of the cooling medium in the chamber (103) is set to be −30 degree Celsius. The cooling medium circulates from/to the chamber (103) to/from the cooling unit (106) through the means for outlet (105) and the means for inlet (104), to maintain the pre-defined temperature of the cooling medium in the chamber (103). The pre-defined rotational speed of the probing pin is 1800 rpm. Said probing pin a non-deformable tool is made of tungsten carbide material. Wherein the probing pin is harder than the material. The rotating probing pin is brought in contact with the surface of the material at a specified location. The rotating probing pin penetrates through the material at the pre-defined depth. Said predefined depth is 0.3 mm. The rotation of the probing pin is continued at a specified location on the material for the pre-defined time period. Said pre-defined time period is selected based on the required length of the multimodal structure, in the preferred example the pre-defined time period is 5 minutes. After processing for the pre-defined time period the rotating probe is removed from the working material and the supply of power from the power source is discontinued. The said processing generates a multi-modal structure on the surface of the working material i.e. the stainless steel. Said multi-modal grain structure is a coarse grain bi-modal grain structure. Wherein the bi-modal grain structure having a coarse gain of 15 μm while fine grains of nearly 1 μm, located at the grain boundaries of coarse grains.

It will be apparent to a person skilled in the art that the above description is for illustrative purposes only and should not be considered as limiting. Various modifications, additions, alterations, and improvements without deviating from the spirit and the scope of the invention may be made by a person skilled in the art.

We claim:
1. An apparatus (100) for modifying surface grain structure of a material, for generating a multi-modal grain structure, comprising of:
 a. a work station (101), for processing the working material;
 b. a fastener, wherein the working material of required dimension and thickness is fastened to the work station (101) by the fastener;
 c. a spindle (102), positioned above the work station (101) at a pre-defined height, said height of the spindle (102) from the work station is adjustable, said spindle (102) is movable, wherein the spindle (102) is rotated at pre-defined speed;
 d. a collet, affixed inside the spindle (102);
 e. a probing pin, accommodated within the collet;
 f. a motor, said motor is operatively connected to the spindle (102), wherein said motor provides rotational energy to the spindle (102);
 g. a controller, said controller controls the movement, rotation speed and the height adjustment of the said spindle (102);
 h. a chamber (103), positioned on top of the work station (101), wherein said chamber (103) accommodates the fastener, coolant, working material held in place by the fastener, an inlet (104) and an outlet (105);
 i. a cooling unit (106), said cooling unit (106) conducts a cooling medium to the said chamber (103) through the said inlet (104) and the said outlet (105) wherein said coolant temperature ranges from −100 to +30 degree Celsius; and
 j. a power source, said power source supplies power to the said cooling unit (106), said motor and said work station (101),
 wherein the probing pin rotating at a speed of 1000-2500 rpm generates a bi-modal grain structure comprising coarse grain of 15 μm and fine grain on the boundaries of about 1 μm.

2. The apparatus for modifying surface grain structure of the material, as claimed in claim 1, wherein the said cooling unit is further provided with a controller (107), for controlling the temperature and volume of the said cooling medium to be circulated to/from the chamber.

3. The apparatus for modifying surface grain structure of the material, as claimed in claim 1, wherein said work station (101) is fixed on table of a vertical milling machine.

4. The apparatus for modifying surface grain structure of the material, as claimed in claim 1, wherein said chamber (103) is a 4-wall chamber.

5. The apparatus for modifying surface grain structure of the material, as claimed in claim 1, said pre-defined speed of the spindle (102) ranges from 50 rpm to 5000 rpm.

6. The apparatus for modifying surface grain structure of the material, as claimed in claim 1, said probing pin is made of a material harder than that of the working material.

7. The apparatus for modifying surface grain structure of the material, as claimed in claim 1, said cooling medium is a fluid coolant.

8. A method for modifying surface grain structure of a material, for generating a multi-modal grain structure, comprising of,
   a. fixing the working material to the work station (101)
   b. supplying power to the work station (101), the motor, and the cooling unit (106) via the power source;
   c. circulating the cooling medium from/to the cooling unit (106) to/from the chamber (103) through the inlet (104) and the outlet (105), to maintain a pre-defined temperature of the chamber, wherein the working material is submerged by the cooling medium in the chamber (103) wherein said pre-defined temperature of the cooling medium in the said chamber (103) ranges from −100 to +30 degree Celsius;
   d. rotating the said probing pin affixed to the spindle (102) at a pre-defined rotational speed, wherein the said motor provides rotational energy to the spindle (102), wherein said spindle (102) rotates at a pre-defined rotational speed, thereby rotating the said probing pin;
   e. bringing the rotating probing pin in contact at a specified location of the surface of the working material, wherein the said probing pin penetrates through the material at a pre-defined depth;
   f. continuing the rotational process of the probing pin at a pre-defined rotational speed for a pre-defined time period at a specified location on the surface of the working material;
   g. removing the rotating probing pin from the material after the pre-defined time period of rotation; and
   h. shutting off the power supply from the power source, wherein the probing pin rotating at a speed of 1000-2500 rpm generates a bi-modal grain structure comprising coarse grain of 15 μm and fine grain on the boundaries of about 1 μm.

9. The method for modifying surface grain structure of the material, as claimed in claim 8, said pre-defined rotational speed ranges from 50 rpm to 5000 rpm.

10. The method for modifying surface grain structure of the material, as claimed in claim 8, said pre-defined depth of penetration of the rotating probing pin through the working material is up to 0.3 mm of the material.

11. The method for modifying surface grain structure of the material, as claimed in claim 8, said predefined time period of rotation of the probing pin is modulated based on required length scale of the surface grain modification and/or the multimodal grain structure.

12. The method for modifying surface grain structure of the material, as claimed in claim 8, said predefined time period of rotation of the probing pin ranges between 30 seconds and 60 minutes.

13. The apparatus for modifying surface grain structure of the material, as claimed in claim 1, said pre-defined speed of the spindle (102) ranges from 1000 rpm to 2500 rpm.

14. The method for modifying surface grain structure of the material, as claimed in claim 8, wherein said pre-defined rotational speed ranges 1000 rpm to 2500 rpm.

* * * * *